Patented Mar. 5, 1946

2,395,800

UNITED STATES PATENT OFFICE 2,395,800

METHOD FOR THE PREPARATION OF 1,3-DIKETONES

Albert B. Boese, Jr., Pittsburgh, Pa., and Frank G. Young, Jr., Charleston, W. Va., assignors to Carbide and Carbon Chemicals Corporation, a corporation of New York No Drawing. Application May 26, 1944, Serial No. 537,532

17 Claims. (Cl. 260—586)

This invention relates to the synthesis of beta-diketones by the rearrangement of enol-esters isomeric therewith, as in the conversion of iso-propenyl acetate, $CH_3CO \cdot O \cdot C(CH_3):CH_2$, to acetyl acetone, $CH_3COCH_2COCH_3$.

The invention is based on my discovery that an acyl ester of the enolic form of a ketone may be caused to undergo rearrangement by heating it to an elevated temperature. Such enol-esters are characterized by the presence therein of the group—$RCO \cdot O \cdot C:C=$ and in the resulting isomeric change the acyl group, $RCO$—, migrates from the enolic oxygen atom to the second ethyl-enic carbon atom to form a diketone in which two carbonyl groups are attached to the same carbon atom. Diketones of the type having carbonyl groups attached to the same carbon atom are commonly referred to as 1,3-diketones or beta-diketones.

My discovery seems to be of general applicability to the acyl enol-esters of ketones. Enol-esters which may be isomerized to the corresponding 1,3-diketone include the acetic acid esters of the enol form of such ketones as: acetone, $CH_3COCH_3$; methyl ethyl ketone, $$CH_3COC_2H_5$$

methyl propyl ketones, $CH_3COC_3H_7$; methyl butyl ketones, $CH_3COC_4H_9$; methyl pentyl ketones, $CH_3COC_5H_{11}$; methyl hexyl ketones, $CH_3COC_6H_{13}$; methyl heptyl ketones, $CH_3COC_7H_{15}$; methyl octyl ketones, $CH_3COC_8H_{17}$; methyl nonyl ketones, $CH_3COC_9H_{19}$; methyl decyl ketones, $$CH_3COC_{10}H_{21}$$

diethyl ketone, $C_2H_5COC_2H_5$; ethyl propyl ketones, $C_2H_5COC_3H_7$; ethyl butyl ketones, $C_2H_5COC_4H_9$; ethyl pentyl ketones, $C_2H_5COC_5H_{11}$; ethyl hexyl ketones, $C_2H_5COC_6H_{13}$; ethyl heptyl ketones, $C_2H_5COC_7H_{15}$; dipropyl ketones, $C_3H_7COC_3H_7$; propyl butyl ketones, $C_3H_7COC_4H_9$; propyl pentyl ketones, $C_3H_7COC_5H_{11}$; propyl hexyl ketones, $C_3H_7COC_6H_{13}$; dibutyl ketones, $C_4H_9COC_4H_9$; butyl pentyl ketones, $C_4H_9COC_5H_{11}$; dipentyl ketones, $C_5H_{11}COC_5H_{11}$; methyl cyclohexyl ketone, $CH_3COC_6H_{11}$; ethyl cyclohexyl ketone, $$C_2H_5COC_6H_{11}$$

propyl cyclohexyl ketones, $C_3H_7COC_6H_{11}$; cyclohexyl acetone, $C_6H_{11}CH_2COCH_3$; cyclohexanone, $C_6H_{10}O$; methyl cyclohexanones, $CH_3C_6H_9O$; ethyl cyclohexanones, $C_2H_5C_6H_9O$; propyl cyclohexanones, $C_3H_7C_6H_9O$; butyl cyclohexanones, $$C_4H_9C_6H_9O$$

acetophenone, $C_6H_5COCH_3$; tolyl methyl ketones, $CH_3C_6H_4COCH_3$; benzyl methyl ketone, $$C_6H_5CH_2COCH_3$$

In addition to the acetic acid ester of the enol form of the ketones there may be used the enol-esters of such acids as: propionic acid, $$C_2H_5COOH$$

butyric acids, $C_3H_7COOH$, pentanoic acids, $$C_4H_9COOH$$

hexanoic acids, $C_5H_{11}COOH$, heptanoic acids, $C_6H_{13}COOH$, octanoic acids, $C_7H_{15}COOH$, nonanoic acids, $C_8H_{17}COOH$, decanoic acids, $$C_9H_{19}COOH$$

benzoic acid, $C_6H_5COOH$, toluic acids, $$CH_3C_6H_4COOH$$

phenyl acetic acid, $C_6H_5CH_2COOH$, phenyl propionic acids, $C_6H_5C_2H_4COOH$, phenyl butyric acids, $C_6H_5C_3H_6COOH$, dimethyl benzoic acids, $$(CH_3)_2C_6H_3COOH$$

hexahydrobenzoic acid, $C_6H_{11}COOH$, hexahydrotoluic acids, $CH_3C_6H_{10}COOH$.

The reaction which takes place may be illustrated by the following general equation:

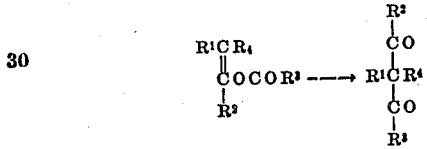

in which $R^1$ and $R^4$ may be hydrogen, aliphatic or aromatic; $R^2$ and $R^3$ may be aliphatic or aromatic or $R^1$ and $R^2$ taken together may be part of a cycloaliphatic ring. By the term aliphatic it is meant to include cycloaliphatic.

The conversion of an enol-ester to the isomeric beta-diketone may be carried out by heating the starting material to an elevated temperature in a suitable reactor. If desired, the enol-ester may be refluxed in a ketene lamp over a heated metal filament. For commercial production of the beta-diketones, the conversion may be effected by passing the vapors of the enol-ester through a heated tube which is fitted with a vaporizer, preheater and condenser. The tube may be constructed of chrome iron, nichrome, stainless steel, silica or other material which is resistant to the corrosive action of the diketone produced. On a single pass of the enol-ester through the converter, yields of diketone of from 20 to 60 per cent may be obtained in efficiencies as high as 80 to 95 per cent. If desired, the converter may be packed with an inert material although excellent results are obtainable in the absence of a packing material. The conversion appears to be brought about primarily by a thermal reaction since such basic or acidic materials as were tried for catalytic activity had a definite deleterious effect on the yield. With the exception of a small amount of tarry material, no by-products or side-reaction products of significance are formed, and the main reaction product may be separated from unchanged starting material by ordinary procedures for recovery or purification, as by distillation at a suitable pressure or the like.

In general, the useful conversion temperatures lie in the range from 300° to 700° C., but the most satisfactory results are obtainable at a temperature of about 500° to 600° C. which is preferred. With decrease in temperatures below 500° C., the yield falls off rapidly while at temperatures substantially above 500° C., the loss of the acylated ketone by decomposition becomes excessive.

Enol-esters which are the starting materials for carrying out my process may be obtained in various ways, for instance, by ester interchange, using an enol-ester such as isopropenyl acetate as the acylating agent for reaction with the ketone. This latter method is no part of the present invention but is described and claimed in copending applications of Quattlebaum and Noffsinger filed on or about June 6, 1944, Serials Nos. 539,024 and 539,025.

The present invention may be further illustrated by the following examples:

Example 1

Acetyl acetone

Isopropenyl acetate was passed through a heated chrome iron tube, having an inside diameter of one inch, at a uniform rate of about 225 grams per hour for a period of four hours. The apparatus included a vaporizer and a preheater for the isopropenyl acetate and an efficient condenser for collecting the conversion products at the outlet of the tube. Over a distance of 21 inches of its length the converter tube was maintained at a temperature of 500° C. by electrical heating. The vaporizer and preheater were maintained at temperatures of 180° C. and 300° C. respectively.

On distillation of the condensate from the four-hour run there was obtained 407 grams of acetyl acetone distilling at 69°–70° C. at an absolute pressure of 100 millimeters of mercury, and 427 grams of recovered isopropenyl acetate. These values correspond to a single pass yield of 45.3 per cent and an efficiency of 86.2 per cent.

Example 2

Benzoyl acetone

Alpha-acetoxystyrene which was obtained by reacting ketene with acetophenone was passed through a heated silica tube at a uniform rate of about 55.3 grams per hour for a period of three hours. The inside diameter of the tube was one inch and the temperature of the tube, over about 22 inches of its length, was maintained at approximately 500° C. On distillation of the condensate obtained from the three-hour run, there was obtained 101 grams of benzoyl acetone,

which represented a single pass yield of 60.8 per cent. There was also recovered 40 grams of unchanged alpha-acetoxy styrene for a conversion efficiency of 80.1 per cent.

Example 3

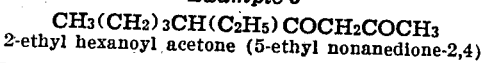
2-ethyl hexanoyl acetone (5-ethyl nonanedione-2,4)

Isopropenyl 2-ethyl hexanoate was converted to 2-ethyl hexanoyl acetone at a temperature of 500° C., using an apparatus and procedure similar to that described in Example 2. On distillation of the condensate obtained from a three-hour run during which 150 grams of enol-ester were passed through the converter, there was obtained 92.4 grams of 2-ethyl hexanoyl acetone distilling at 90° C. at an absolute pressure of 5 millimeters of mercury. 2-ethyl hexanoyl acetone was found to be a colorless liquid having the following properties: D 20/20, 0.9060; $N_D^{30}$, 1.4600. The single pass yield was 61.6 per cent. The recovery of unchanged starting material was 32.1 grams per cent for an efficiency of 78.3 per cent.

Example 4

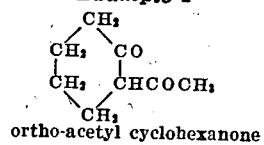
ortho-acetyl cyclohexanone

Acetoxycyclohexene made by the reaction of ketene with cyclohexanone was converted to ortho-acetylcyclohexanone at a temperature of 500° C., using a silica tube packed with ceramically bonded, fused aluminum oxide. Except for the packing, the apparatus and procedure were substantially as described in Example 2. Over a period of five hours 574 grams of acetoxycyclohexene were passed through the converter tube. The resulting condensate which was distilled under reduced pressure yielded 272 grams of ortho-acetyl cyclohexanone, distilling at 80°–80.5° C. at an absolute pressure of 5 millimeters of mercury, and 248 grams of unchanged starting material. The single pass yield was 43 per cent and the efficiency was as 82 per cent.

The foregoing results were obtained after the packed converter had been in service for a period of time and a thin coating of carbon had been deposited on the aluminum oxide packing. It was observed that until the thin deposition of carbon had formed, some decomposition of material to lower boiling substances took place, with a resultant lower yield.

Example 5

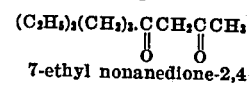
7-ethyl nonanedione-2,4

The enol-acetate of 5-ethyl heptanone-2 made by the reaction of ketene with the ketone, was converted to the isomeric diketone at a temperature of 500° C., using an unpacked silica tube as the converter. The tube which had an inside diameter of one inch was heated for 22 inches of its length. The enol-ester was supplied to the converter at a uniform rate of 130 milliliters per hour. Otherwise the procedure was substantially as described in Example 2. Distillation of the condensate obtained from a three-hour run during which 290 grams of the enol-ester were passed through the converter, yielded 63.2 grams of 7-ethyl nonanedione-2,4 distilling at 119° C., at an absolute pressure of 15 millimeters of mercury. The diketone was found to have the following properties: D 20/20, 0.924; n 20/D, 1.4508; M calculated at 54.10, observed 54.12. The amount of unchanged enol-ester recovered was 180.3 grams. The single pass yield was 22.2 per cent and the efficiency 60.5 per cent.

The invention is susceptible of modification within the scope of the appended claims.

What is claimed is:

1. A method of making a beta-diketone from an enol-ester isomeric therewith which comprises heating an acyl ester of the enolic form of a ketone to a temperature of about 300° to 700° to cause said acyl group of the acyl ester to migrate to form a diketone having two carbonyl groups attached to the same aliphatic carbon atom.

2. A method of making a beta-diketone from an enol-ester isomeric therewith which comprises heating an acyl ester of the enolic form of a ketone to a temperature of about 500° C. to cause said acyl group of the acyl ester to migrate to form a diketone having two carbonyl groups attached to the same aliphatic carbon atom.

3. A method of making a beta-diketone from an enol-ester isomeric therewith which comprises heating the acyl ester of a ketone to a temperature of about 300° to 700° C. in the vapor phase to cause said acyl group of the acyl ester to migrate to form a diketone having two carbonyl groups attached to the same aliphatic carbon atom.

4. A method of making a beta-diketone from an enol-ester isomeric therewith which comprises heating an acyl ester of the enolic form of a ketone to a temperature of about 300° to 700° C. to form a diketone having two carbonyl groups attached to the same aliphatic carbon atom, said acyl group containing not more than twelve carbon atoms.

5. A method of making a beta-diketone from an enol-ester isomeric therewith which comprises heating an acyl ester of the enolic form of a ketone which ketone contains not more than twelve carbon atoms to a temperature of 300° to 700° C. to cause the acyl group to migrate to form a diketone having the two carbonyl groups attached to the same aliphatic carbon atom.

6. A method of making a beta-diketone containing two acyl groups attached to the same methylene carbon atom, —CH$_2$—, which comprises heating an acyl ester of the enol form of a ketone having a methyl group CH$_3$, attached to the carbonyl group thereof to a temperature of about 300° to 700° C. to cause said ester to rearrange to form a diketone having two acyl groups attached to the same carbon atom by migration of the acyl group of said ester from the enolic oxygen atom to the methyl carbon atom of said ketone.

7. A method of making a beta-diketone containing two aliphatic acyl groups attached to the same methylene carbon atom, —CH$_2$—, which comprises heating an aliphatic acyl ester of the enol form of an aliphatic ketone having a methyl group, CH$_3$—, attached to the carbonyl group thereof to a temperature of about 300° to 700° C. to cause said ester to rearrange to form a diketone by migration of the acyl radical of said ester from the enol oxygen atom to the methyl group of said ketone.

8. A method of making a beta-diketone having two aromatic acyl groups attached to the same methylene carbon atom, —CH$_2$—, which comprises heating an aromatic acyl ester of the enol form of a ketone having a methyl group and an aromatic group attached to the carbonyl group thereof to a temperature of about 300° to 700° C. to cause said ester to rearrange to form a diketone having two aromatic acyl groups attached to the same carbon atom by migration of the aromatic acyl group of said ester from the enolic oxygen atom to the methyl carbon atom of said ketone.

9. A method of making a beta-diketone in which one of the carbonyl groups thereof is in a cycloaliphatic ring, which comprises heating an acyl ester of the enol form of a cycloaliphatic ketone to a temperature of about 300° to 700° C. to cause said ester to rearrange to form a diketone having the two carbonyl groups attached to the same carbon atom by migration of the acyl group of said ester from the enolic oxygen atom to a carbon atom adjacent the carbonyl group of the ketone.

10. A method of making an acyl acetone which comprises heating an acyl ester of the enolic form of acetone to a temperature of about 300° to 700° C. to cause said ester to rearrange to form an acyl acetone isomeric therewith by migration of the acyl group from the enolic oxygen atom to a carbon atom.

11. A method of making an acyl acetone which comprises heating an aliphatic acyl ester of the enolic form of acetone to a temperature of about 300° to 700° C. to cause said ester to rearrange to form an aliphatic acyl acetone isomeric therewith by migration of the aliphatic acyl group from the enolic oxygen atom to a carbon atom.

12. A method of making an acyl acetophenone which includes heating an acyl ester of the enolic form of acetophenone to a temperature of about 300° to 700° C. to cause said ester to rearrange to form an acyl acetophenone isomeric therewith by migration of the acyl group to the beta carbon atom of the side chain of acetophenone.

13. A method of making an aliphatic acyl acetophenone which includes heating an aliphatic acyl ester of the enolic form of acetophenone to a temperature of about 300° to 700° C. to cause said ester to rearrange to form an aliphatic acyl acetophenone isomeric therewith by migration of the aliphatic acyl group from the enolic oxygen atom to the beta carbon atom of the side chain of acetophenone.

14. A method of making acetyl acetone which comprises heating isopropenyl acetate to a temperature of about 500° to 600° C. to cause it to rearrange by migration of the acetyl group to a carbon atom.

15. A method of making acetyl acetone which comprises heating isopropenyl acetate to a temperature of about 300° to 700° C. to cause it to rearrange by migration of the acetyl group to a carbon atom.

16. A method of making acetyl acetone which comprises heating isopropenyl acetate in the vapor phase at a temperature of about 500° C. to cause it to rearrange by migration of the acetyl group to a carbon atom.

17. As a new chemical compound 5-ethyl nonanedione-2,4.

ALBERT B. BOESE, Jr.
FRANK G. YOUNG, Jr.